(12) United States Patent
Goebbert et al.

(10) Patent No.: US 10,226,741 B2
(45) Date of Patent: Mar. 12, 2019

(54) FILTER MEMBRANE MODULE, AND METHOD FOR ITS PRODUCTION

(71) Applicant: NANOSTONE WATER GMBH, Halberstadt (DE)

(72) Inventors: Christian Goebbert, Eschau (DE); Manfred Volz, Grossrosseln (DE)

(73) Assignee: Nanostone Water GmbH, Halberstadt (DE)

( * ) Notice: Subject to any disclaimer, the term of this patent is extended or adjusted under 35 U.S.C. 154(b) by 251 days.

(21) Appl. No.: 15/154,793

(22) Filed: May 13, 2016

(65) Prior Publication Data

US 2016/0361689 A1    Dec. 15, 2016

Related U.S. Application Data

(63) Continuation of application No. 13/591,089, filed on Aug. 21, 2012, now abandoned, which is a
(Continued)

(30) Foreign Application Priority Data

Feb. 22, 2010  (DE) .................. 10 2010 008 869
Apr. 22, 2010  (DE) ................... 20 2010 005 971 U

(51) Int. Cl.
| | | |
|---|---|---|
| *B01D 63/06* | (2006.01) | |
| *B01D 46/00* | (2006.01) | |
| *B01D 46/54* | (2006.01) | |
| *B01D 63/02* | (2006.01) | |
| *B01D 65/00* | (2006.01) | |

(52) U.S. Cl.
CPC ....... *B01D 63/066* (2013.01); *B01D 46/0021* (2013.01); *B01D 46/543* (2013.01); *B01D 63/022* (2013.01); *B01D 63/06* (2013.01); *B01D 63/061* (2013.01); *B01D 63/063* (2013.01); *B01D 65/003* (2013.01); *B01D 2313/04* (2013.01)

(58) Field of Classification Search
CPC .. B01D 63/06; B01D 63/066; B01D 46/2425; B01D 46/2429; B01D 46/2451; B01D 46/2455; B01D 46/2459; B01D 46/2462; B01D 46/2466; B01D 46/247; B01D 46/2474; B01D 2046/2477; B01D 2046/2481; B01D 2046/2485; B01D 2046/2488; B01D 2046/2492; B01D 2319/04; B01D 2275/40; B01D 2275/406
See application file for complete search history.

(56) References Cited

U.S. PATENT DOCUMENTS

| | | |
|---|---|---|
| 4,781,831 A | 11/1988 | Goldsmith |
| 5,034,125 A | 7/1991 | Karbachsch et al. |
| 5,062,910 A | 11/1991 | Garcera et al. |
| 5,779,897 A | 7/1998 | Gurudath et al. |
| 5,855,781 A | 1/1999 | Yorita et al. |
| 6,077,436 A | 6/2000 | Rajnik et al. |

(Continued)

FOREIGN PATENT DOCUMENTS

| | | |
|---|---|---|
| CH | 681281 A5 | 2/1993 |
| DE | 3912741 A1 | 12/1989 |

(Continued)

*Primary Examiner* — Pranav N Patel
(74) *Attorney, Agent, or Firm* — Fish & Richardson P.C.

(57) ABSTRACT

The invention relates to a method for producing a membrane module, comprising a plurality of elongated filter elements disposed in parallel adjacent to one another, each element comprising a longitudinal channel, a housing enclosing the filter elements, and a collector chamber between the housing and the filter elements.

25 Claims, 8 Drawing Sheets

Related U.S. Application Data continuation of application No. PCT/EP2011/052074, filed on Feb. 11, 2011.

(56) References Cited

U.S. PATENT DOCUMENTS

| | | | |
|---|---|---|---|
| 6,126,833 | A | 10/2000 | Stobbe et al. |
| 6,328,777 | B1 | 12/2001 | Benthaus et al. |
| 6,846,414 | B2 | 1/2005 | Futselaar et al. |
| 6,958,120 | B2 | 10/2005 | Blase et al. |
| 7,294,267 | B2 | 11/2007 | Takeda et al. |
| 2001/0035374 | A1 | 11/2001 | Yamamoto |
| 2002/0038536 | A1 | 4/2002 | Best et al. |
| 2004/0035786 | A1 | 2/2004 | Goldsmith |
| 2004/0076874 | A1 | 4/2004 | Nickel et al. |
| 2005/0279693 | A1 | 12/2005 | Katsu et al. |
| 2006/0096907 | A1 | 5/2006 | Hahmann et al. |
| 2007/0144716 | A1 | 6/2007 | Doh et al. |
| 2008/0035270 | A1 | 2/2008 | Coan |
| 2011/0198278 | A1 | 8/2011 | Gabriel et al. |
| 2013/0153485 | A1 | 6/2013 | Goebbert et al. |

FOREIGN PATENT DOCUMENTS

| | | |
|---|---|---|
| DE | 69019552 T2 | 9/1995 |
| DE | 19846041 A1 | 4/2000 |
| DE | 69713859 T2 | 1/2003 |
| DE | 102005008900 A | 2/2005 |
| DE | 20321132 U1 | 2/2006 |
| DE | 60024966 T2 | 8/2006 |
| DE | 102006008453 A1 | 8/2007 |
| DE | 102007052088 A1 | 5/2009 |
| EP | 0288030 A1 | 10/1988 |
| EP | 0299459 A2 | 1/1989 |
| EP | 385089 A1 | 9/1990 |
| EP | 0270051 B1 | 9/1991 |
| EP | 1060784 A1 | 12/2000 |
| EP | 1268043 B1 | 1/2003 |
| EP | 1374979 A2 | 1/2004 |
| EP | 1897603 B1 | 1/2015 |
| JP | H05146609 A | 6/1993 |
| JP | 2009160561 A | 7/2009 |
| WO | 2002076591 A1 | 10/2002 |
| WO | 2007128565 A3 | 11/2007 |
| WO | 2010015374 A1 | 2/2010 |
| WO | 2011101295 A1 | 8/2011 |

FILTER MEMBRANE MODULE, AND METHOD FOR ITS PRODUCTION

CROSS-REFERENCE TO RELATED APPLICATIONS

This application is a continuation of U.S. application Ser. No. 13/591,089 filed on Aug. 21, 2012, which is a continuation of International Application No. PCT/EP2011/052074 filed on Feb. 11, 2011, which claims the benefit of DE 10 2010 008 869.2, filed Feb. 22, 2010, and DE 20 2010 005 971.2, filed Apr. 22, 2010. The disclosures of the above applications are incorporated herein by reference.

FIELD

The present disclosure relates to a filter membrane module and a method for producing a filter membrane module.

BACKGROUND

The statements in this section merely provide background information related to the present disclosure and may not constitute prior art.

One such membrane module includes an elongated filter element, which is penetrated by at least one longitudinal conduit and comprises a porous material, such as ceramic. The module further includes a housing, which surrounds the filter element and with it forms a collection chamber.

Such a module functions as follows: Into one end of each longitudinal conduit, the medium to be treated, the so-called unfiltrate, is introduced. Along the course of the unfiltrate, filtrate passes through the wall surface of the longitudinal conduit, enters the aforementioned collection chamber between the filter element and the housing, and is carried away from there as filtrate. The unfiltrate emerges from the other end of the longitudinal conduits and is optionally returned to the first end of the longitudinal conduit, so as to form a cycle. The wall surfaces of the longitudinal conduits are coated with a material that is also permeable to a certain extent. This usually very thin film usually forms the actual filtration device.

A single filter element has a plurality of longitudinal conduits (multi-conduit element). A plurality of such multi-conduit elements is combined to form a membrane module from them.

On each face end of the filter elements, there is a face-end plate. It defines the annular chamber between the housing and the filter elements, specifically in such a way that the annular chamber is sealed off from the outer environment at least in fluid-tight fashion. Sealing it off can be problematic, since during operation varying temperatures prevail, which lead to expansion and contraction of structural parts, in fact in different ways. The face-end boundary plates may for instance be of special steel.

Exemplary embodiments have become known from EP 0 270 051 B1 and DE 690 19 552 T2. EP 1 374 979 A2 describes a filter membrane module having a multitude of spaghetti-type individual filter capillaries, which are bundled at theirs ends by means of a potting material. DE 600 24 966 T2 discloses a thermoplastic filter cartouche with a plurality of concentric filter tubes. US 2008/0035270 A1 relates to a filter membrane module having a multitude of fibers, the ends of which are bundled by means of a potting material. US 2007/0144716 A1 describes a device with porous membranes, the ends of which being unitarily combined by potting.

SUMMARY

The object of the invention is to provide a filter membrane module having a high filter performance and offering more simple and thus cheaper manufacturing.

This object is attained by the features of the independent claims.

One fundamental concept of the invention is that a plastic potting material, such as a thermoplastic, in particular a polymer, is applied to the end region of the filter elements. The plastic thus blocks off the interstices between the filter elements. It forms a mounting ring, which in turn surrounds the filter elements in their end region.

The term "plastic" should be understood in the broadest sense. For instance, thermoset plastics or dual-component plastics such as epoxies or acrylates can be considered.

This method is performed on both ends of the bundle of filter elements, so that two mounting rings are created. Then the housing is slipped onto both mounting rings and thus onto the filter element bundle.

In an inventive multi-conduit element, a mounting ring, again comprising a plastic potting material, is first applied to one end and then to the other end of the filter element. After the application, in both cases the plastic potting material is made to harden. The same is done on the other end. Then the housing is again slipped onto the two mounting rings.

Flat membranes can be manufactured at low cost. By means of the flat and large interstices formed between the filter elements, the filtrate can be bled off very efficiently.

The housing can be formed of the same material as the mounting rings. The housing can even be in one piece with one of the two mounting rings, by being produced in a single potting operation.

In filter devices of the aforementioned structural type with ceramic filter elements, one known problem is the variably pronounced expansion under the influence of heat. This problem arises when materials with different coefficients of thermal expansion are used.

It is therefore recommended that the bearing of the housing on at least one of the mounting rings be embodied as a loose bearing, so that impermissible thermal stresses do not occur between the ceramic part and the housing.

The housing can be provided with connections for supplying or removing medium, for example for the medium to be treated (so-called unfiltrate) or for the treated medium (filtrate). If the housing is made from thermoplastic material, then potting the connection ports integrally with it is an attractive option.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 shows a single hollow ceramic fiber (spaghetti) in perspective.

FIG. 2, in an axially vertical cross section, shows three pieces of spaghetti filter elements combined in a bundle.

FIG. 3 shows a bundle of spaghetti filter elements surrounded by a sleeve.

FIG. 4 schematically shows the subject of FIG. 3, with one end dipped into a tub that contains a potting material.

DETAILED DESCRIPTION

Figure 1:
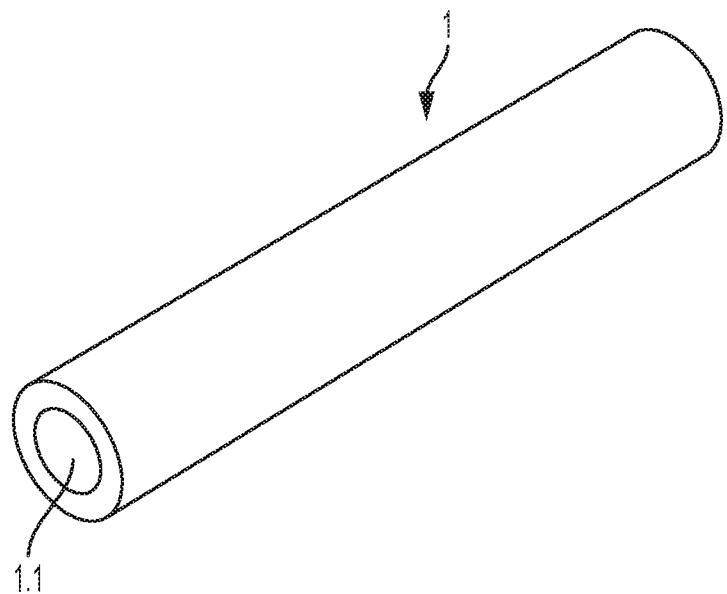

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Figure 2:
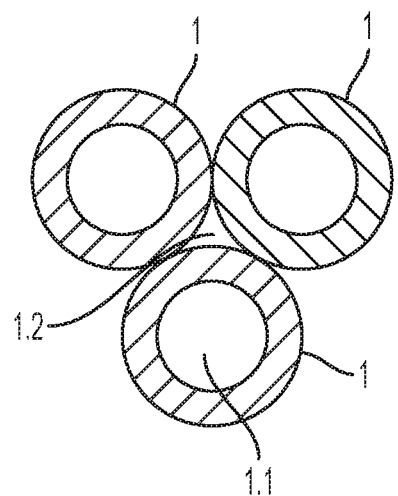

A spaghetti element 1 shown in FIG. 1 is of ceramic. It surrounds a longitudinal conduit 1.1. The spaghetti bundle shown in FIG. 2 includes three pieces of spaghetti 1, each with a longitudinal conduit 1.1. The three pieces of spaghetti enclose a hollow space 1.2 between them.

Figure 3:
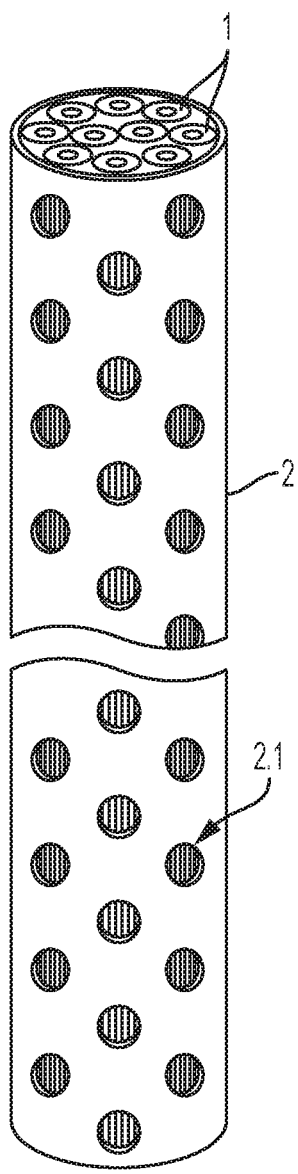

FIG. 3 shows a bundle of spaghetti 1 surrounded by a sleeve 2. The sleeve 2 has a plurality of openings 2.1, so that there is a conductive connection between the hollow spaces 1.2, each located between pieces of spaghetti 1 adjacent one another, and the external environment.

Figures 4, 5:
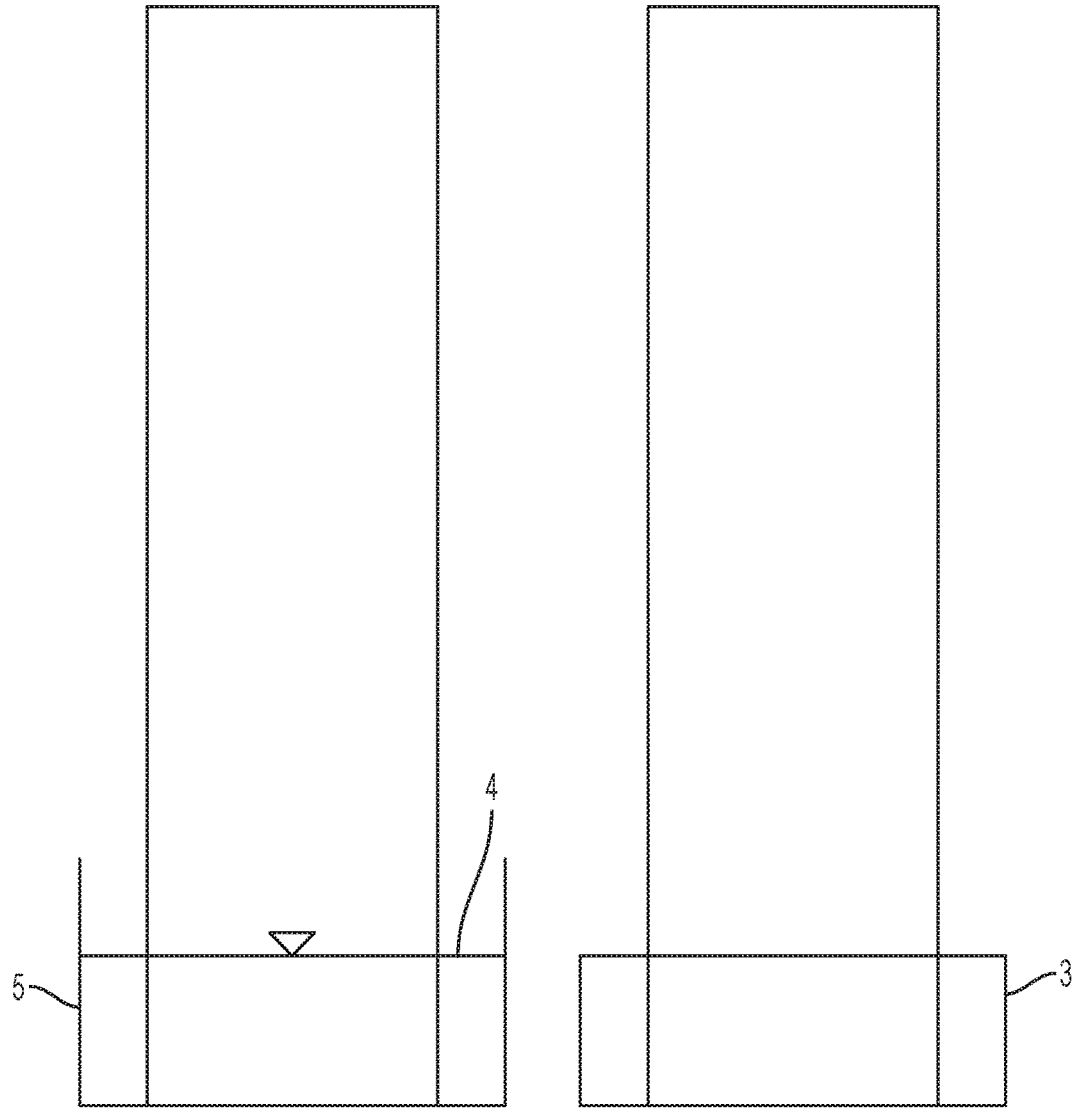
FIG. 5 shows the bundle with the sleeve of FIG. 3 after the potting material has hardened.

FIG. 4 schematically illustrates the application of a mounting ring 3—see also FIG. 5. For that purpose, the subject of FIG. 3 is dipped by one of its ends into a potting material 4, which is located in a tub 5. The potting material 4 comprises plastic, such as a thermoplastic material, or synthetic resin. After the subject of FIG. 3 has been dipped, the potting material penetrates through the openings 2.1 into the hollow spaces 1.2 in the spaghetti 1 and fills them up. After the potting material has hardened, the result is the subject shown in FIG. 5, that is, the spaghetti bundle, surrounded by the sleeve 2, with the mounting ring 3.

For the filtration process, it is necessary that the longitudinal conduits 1.1 remain open. This can be achieved in various ways. If the lower end face of the bundle is absolutely flat and flush with the bottom of the tub 5, then the penetration of potting material into the longitudinal conduits 1.1 can be prevented. The ends of the longitudinal conduits 1.1 could also be provided with plugs, but this is tedious and expensive. Finally, after the state shown in FIG. 5 is reached, the bundle can be shortened, by cutting off a desired piece at its lower end, since because the diameter of the longitudinal conduits is so slight, the potting material does not penetrate them overly much.

Figure 6:
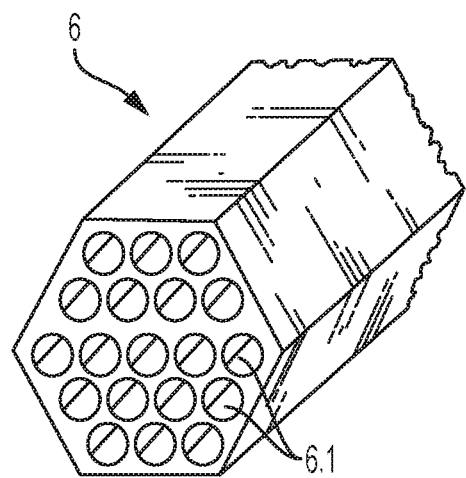
FIG. 6 shows the end region of a multi-conduit element in perspective.
Figure 7:
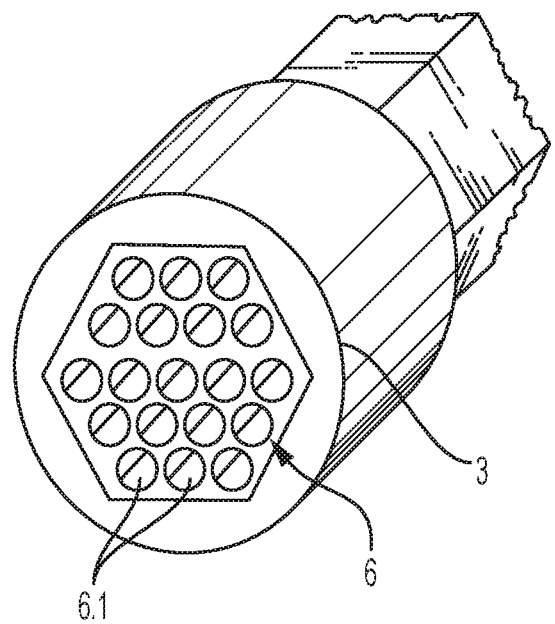
FIG. 7 shows the subject of FIG. 6, provided with a mounting ring.

FIG. 6 shows the end region of a multi-conduit element 6 having a plurality of longitudinal conduits 6.1. The element 6 is of ceramic. It is hexagonal in cross section. Still other cross sections are also possible here, such as round or oval ones.

The application of mounting rings is done for the multi-conduit element in precisely the same way as for the spaghetti element. See FIGS. 4 and 5. However, what is crucial here is solely the application of the mounting ring 3. Conversely, it is no longer crucial to fill up hollow spaces analogously to the hollow spaces 1.2 in the bundle shown in FIG. 2.

Figure 8:
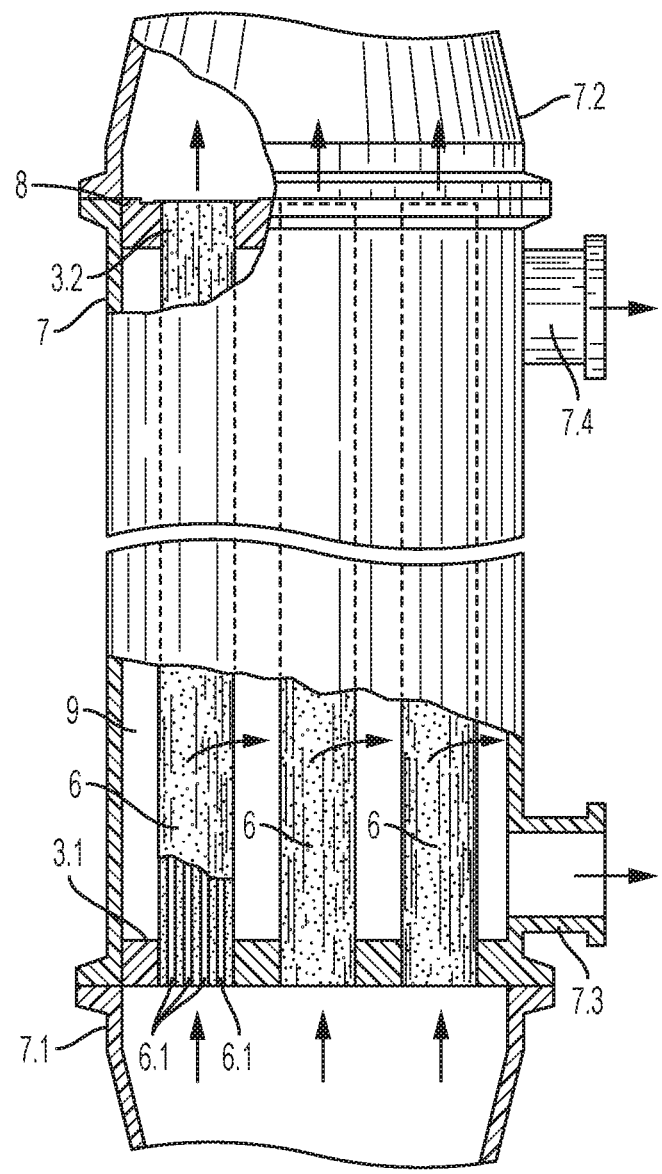
FIG. 8 shows the complete filter device in an elevation view and partly cut away, including a plurality of filter elements in one housing.

In each case, the mounting rings 3 are seated solidly on the spaghetti bundle, or on the multi-conduit element. Now a union with a housing must be established. The finished filter apparatus is seen in FIG. 8. In it, a plurality of multi-conduit elements 6 are surrounded by a housing 7. Instead of the multi-conduit elements 6, spaghetti elements could also be provided.

The housing 7 in the embodiment shown comprises a thermoplastic material. This is the same material that comprises the mounting ring 3. The housing 7 and mounting ring 3 are produced in a single potting operation and are thus in one piece. This is true in any case for the lower mounting ring 3.1, which in a sense forms the bottom of the housing 7. It does not apply to the upper mounting ring 3.2, however. There is a seam between it and the upper end of the housing, so that an axial relative motion between the upper mounting ring 3.2 and the housing 7 is possible. It is thus also ensured that during the operation of the filter apparatus, the housing 7 can expand to different extents compared to the structural parts surrounded by the housing, namely the multi-conduit elements 6.

At this point, however, a seal is required. See the O-ring 8. This ring is let into the outer circumference of the upper mounting ring 3.2. It can already be potted integrally with the mounting ring 3.2 in the operation of potting the mounting ring.

The individual multi-conduit elements 6 are surrounded by a collection chamber 9.

The housing 7 includes a lower cap 7.1 and an upper cap 7.2. Two connection stubs, namely a lower connection stub 7.3 and an upper connection stub 7.4, are also formed integrally with the cylindrical part of the housing.

The filter apparatus of FIG. 8 functions as follows:

Through the lower cap 7.1, medium to be filtered (unfiltrate) flows to the lower face ends of the multi-conduit elements 6. There, it enters the longitudinal conduits 6.1 and flows through them. It then emerges from the upper ends of the longitudinal conduits 6.1 and reaches the upper cap 7.2.

Over this course, filtrate passes crosswise to the flow direction into the longitudinal conduits 6.1 through the porous ceramic material of the individual multi-conduit element 6 and reaches the collection chamber 9. From there, it reaches the lower outlet 7.3 and the upper outlet 7.4.

In a known manner, the unfiltrate entering the upper cap 7.2 can be carried in circulatory fashion and delivered to a further filter apparatus, or the same one, where it passes through further filtration operations.

The filtration apparatus shown in FIGS. 9 and 10 again has a housing of a thermoplastic material. The filter elements 1 are of the spaghetti type.

Figure 9:
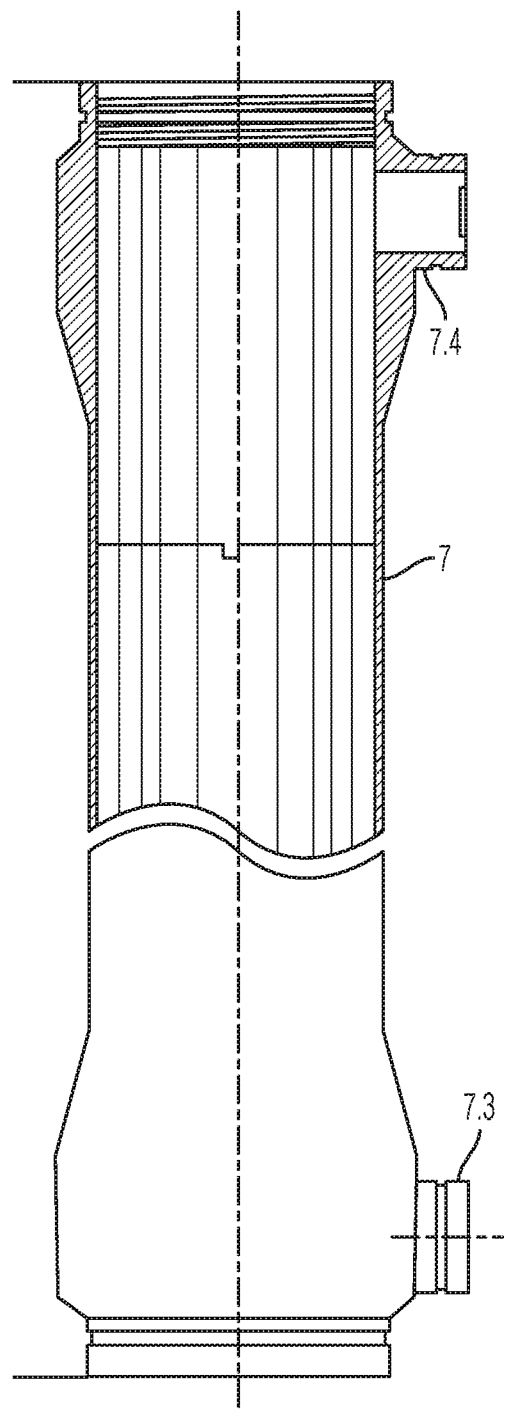
FIG. 9 shows a further filter apparatus in an elevation view and partly cut away.
Figure 10:
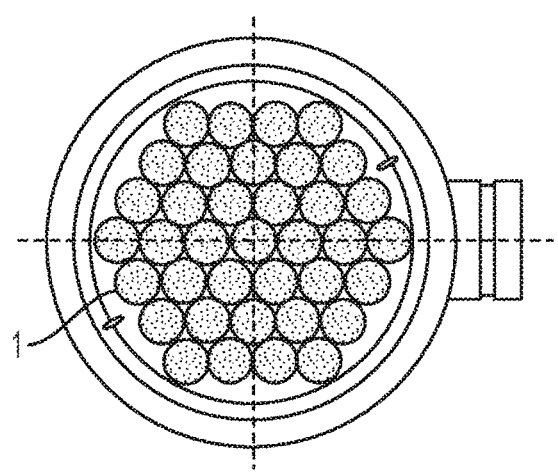
FIG. 10 shows the apparatus of FIG. 9 in a plan view.
Figure 11:
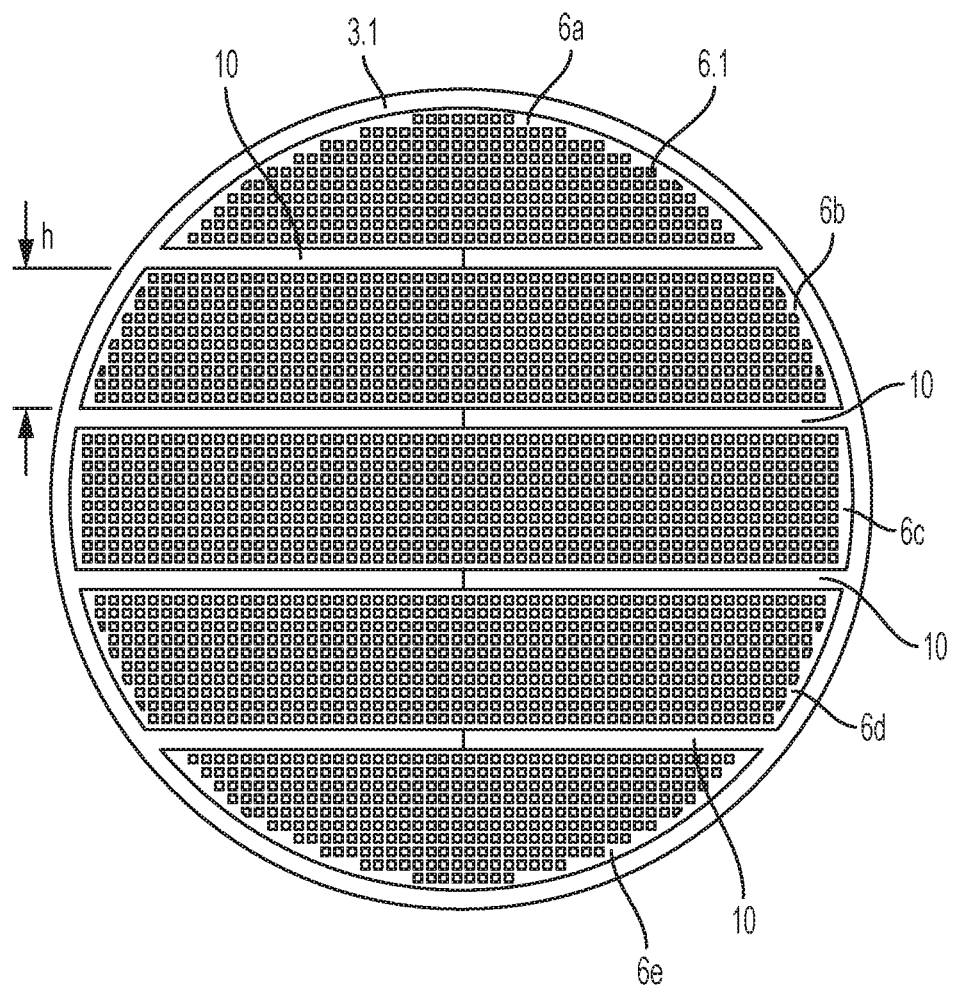
FIG. 11 shows an embodiment of an inventive filter device in cross section, with five flat membranes.

An alternative embodiment of a filtration apparatus, shown in FIG. 11, has a housing, not shown in this drawing, similar to that of FIGS. 9 and 10. However, the multi-conduit elements are not round ("tubular membrane") but instead are embodied in the form of five elements 6a-6e, all of them flat ("flat membranes") between which shallow, wide interstices 10 are present. The flat membranes 6a and 6e and the flat membranes 6b and 6d are embodied identically, but are disposed mirror-symmetrically to one another. Overall, the outer contours of the flat membranes 6a-6e are adapted to insertion into the tubular housing. It is understood that in other embodiments, not shown, a different number of flat membranes can also be used.

The cross sections of the two outer flat membranes 6a and 6e are in the form of classical circular segments, which are bounded on one side by a circular arc and on the other by a chord. The inner flat membranes 6b, 6c and 6d are each bounded by two circular arcs and two chords. The height h of all five flat membranes 6a-6e is identical. For the sake of simplicity, the height is shown in FIG. 11 only for the upper flat membrane 6b in FIG. 11. Here again, it is understood that in an embodiment that is not shown, still other cross sections, such as oval or even free-form cross sections, can also occur. In each flat membrane 6a-6e, there are many longitudinal conduits 6.1, of which for the sake of simplicity only one is provided with a reference numeral in FIG. 11. In the present instance, the longitudinal conduits 6.1 have an approximately square cross section, but they can have a different cross section instead.

The production and material of the embodiment of FIG. 11 are identical to the foregoing embodiments. First, the flat membranes 6a-6e are disposed in the desired manner and at the desired spacing from one another. Then the axial ends of the flat membranes 6a-6e are potted with a plastic material, as shown as an example in conjunction with a different exemplary embodiment in FIGS. 4 and 5 and described above with reference to them. The result on the axial ends is equivalent mounting rings, of which only one mounting ring 3.1 on the end is visible in FIG. 11. The plastic material on the axial ends of the flat membranes 6a-6e is also present in the interstices 10, and as a result, they are produced reliably and durably.

The function is also essentially equivalent to the function that has already been described above in conjunction with the tubular membranes 6: While the medium to be filtered is being conducted through the longitudinal conduits 6.1, the filtrate is conducted away via the interstices 10 and the interstice, between the housing and the flat membranes 6a-6e, that is formed by the mounting ring 3.1.

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A filter membrane module comprising:
   ceramic, elongated filter elements, which each have a plurality of longitudinal conduits;
   a housing surrounding the elongated filter elements;
   the elongated filter elements having potted end regions including a first potted end region and a second potted end region, the potted end regions comprising a mounting ring surrounding the elongated filter elements;
   wherein each of the elongated filter elements are generally flat, stacked, individual membranes, between each of which flat and large interstices are provided;
   wall surfaces of the longitudinal conduits have a filtration material coating such that the medium to be filtrated can be conducted through the longitudinal conduits and the filtered medium can be discharged through the interstices and a collecting space which is formed by the mounting ring between the housing and the flat membranes; and
   wherein each of the flat membranes has a planar cross-section perpendicular to the longitudinal conduits, the planar cross-section having not more than two axes of mirror symmetry along the planar cross-section, and two or more of the flat membranes have cross-sections with sides having a curved profile, and a top and bottom, at least one of the top or bottom having a substantially flat, parallel surfaces, each of the flat membranes having a flat surface facing an interstice, each of the flat surfaces parallel to each to each other.

2. The filter membrane module according to claim 1, wherein each of the elongated filter elements has a segment of a circle cross section.

3. The filter membrane module according to claim 1, wherein at least one of the top or bottom of at least one flat membranes has a curved profile.

4. The filter membrane module according to claim 1, wherein the interstices extend from the first potted end region to the second potted end region.

5. The filter membrane module according to claim 1, wherein at least one of the flat membranes includes a cross-section where the top has a greater length than the bottom.

6. The filter membrane module according to claim 1, wherein at least one of the flat membranes includes a cross-section with only two sides, where a first side is substantially flat and a second side is arcuate.

7. A filter membrane module comprising:
   a plurality of ceramic, elongated filter elements each having a plurality of longitudinal conduits;
   a housing surrounding the elongated filter elements;
   the filter elements having potted end regions, wherein the filter elements are potted with a material which forms a mounting ring surrounding the plurality of filter elements;
   the filter elements are each, individual flat membranes each having a planar cross-section perpendicular to the longitudinal conduits, the planar cross-section of each flat membrane including at least one flat surface and at least one curved surface;
   each of the at least one flat surfaces is a chord of a single circle smaller than a diameter of the mounting ring surrounding the plurality of filter elements, the flat surfaces are disposed mirror symmetrically to one another within the mounting ring;
   for each of the filter elements, across from the chord is an opposite side of the filter element that is:
      a parallel flat surface; or
      a circular arc surface;
   each parallel flat surface of the filter element is parallel with each of the other parallel flat surfaces of the filter element; and
   wall surfaces of the longitudinal conduits have a filtration material coating such that the medium to be filtrated can be conducted through the longitudinal conduits and the filtered medium can be discharged through the interstices and a collecting space which is formed by the mounting ring between the housing and the flat membranes.

8. The filter membrane module according to claim 7, wherein at least one of the filter elements has a cross-section with a region having a shape that is a circular arc.

9. The filter membrane module according to claim 7, wherein the plurality of filter elements comprises end filter elements which are mirror symmetric perpendicular to the chord at a center of the filter element.

10. The filter membrane module according to claim 7, wherein, for at least one of the filter elements, the opposite side is a parallel flat surface, the chord is slightly smaller than the mounting ring, and the opposite side is shorter than the chord.

11. The filter membrane module according to claim 7, wherein the housing comprises a plastic.

12. A filter membrane module comprising:
ceramic, elongated filter elements, which each have a plurality of longitudinal conduits;
a housing surrounding the elongated filter elements;
the elongated filter elements having potted end regions including a first potted end region and a second potted end region, the potted end regions comprising a mounting ring surrounding the elongated filter elements;
wherein the elongated filter elements are each generally flat membranes, between which flat and large interstices are provided;
wall surfaces of the longitudinal conduits have a filtration material coating such that the medium to be filtrated can be conducted through the longitudinal conduits and the filtered medium can be discharged through the interstices and a collecting space which is formed by the mounting ring between the housing and the flat membranes; and
wherein each of the flat membranes has a planar cross-section perpendicular to the longitudinal conduits, the planar cross-section having not more than two axes of mirror symmetry along the planar cross-section;
the plurality of flat membranes comprises two outer flat membranes each having an outer curved surface disposed adjacent to the housing, each of the two outer flat membranes having a circular segment shape;
each of the two outer flat membranes has a flat, planar surface opposite the curved surface, each of the flat planar surface of the outer flat membrane forming a chord of a single circle smaller than a diameter of the mounting ring surrounding the plurality of filter elements;
the plurality of flat membranes comprises a plurality of inner flat membranes disposed between the two outer flat membranes, each of the plurality of inner flat membranes having a top surface, a bottom surface and side surfaces extending between the top surface and the bottom surface, the top and bottom surfaces of each inner flat membrane are flat and parallel to each other, the top and bottom surfaces of each of inner flat membrane are chords of a single circle smaller than a diameter of the mounting ring surrounding the plurality of filter elements, the side surfaces of each inner flat membrane have curved profile; and
the potted end regions include a first potted region and a second potted region, and the interstices extend from the first potted region to the second potted region.

13. The filter membrane module according to claim 12, wherein each of the flat membranes has substantially a same height.

14. The filter membrane module according to claim 12, wherein potting material is disposed on each axial end of the flat membranes.

15. The filter membrane module according to claim 14, wherein potting material is disposed within the interstices.

16. A filter membrane module comprising:
ceramic, individual elongated filter elements, which each have a plurality of longitudinal conduits;
a housing surrounding the elongated filter elements;
the elongated filter elements having potted end regions including a first potted end region and a second potted end region, the potted end regions comprising a mounting ring surrounding the elongated filter elements;
wherein each of the elongated filter elements are each generally flat, individual membranes, between which flat and large interstices are provided, and potting material is disposed within the interstices at the potted end regions;
wall surfaces of the longitudinal conduits have a filtration material coating such that the medium to be filtrated can be conducted through the longitudinal conduits and the filtered medium can be discharged through the interstices and a collecting space which is formed by the mounting ring between the housing and the flat membranes; and
wherein each of the flat membranes has a planar cross-section perpendicular to the longitudinal conduits, the planar cross-section having not more than two axes of mirror symmetry along the planar cross-section;
the plurality of flat membranes comprising two outer flat membranes each having an outer curved surface disposed adjacent to the housing, each of the two outer flat membranes having a circular segment shape;
each of the two outer flat membranes has a flat, planar surface opposite the curved surface;
the plurality of flat membranes comprising a plurality of inner flat membranes disposed between the two outer flat membranes, each of the plurality of inner flat membranes having a top surface, a bottom surface and side surfaces extending between the top surface and the bottom surface, the top and bottom surfaces of each inner flat membrane are flat and parallel to each other, the top and bottom surfaces of each inner flat membrane are chords of a single circle smaller than a diameter of the mounting ring surrounding the plurality of filter elements, the side surfaces of each of the inner flat membrane have curved profile; and
the potted end regions include a first potted region and a second potted region, and the interstices extend from the first potted region to the second potted region.

17. The filter membrane module according to claim 16, wherein each of the interstices extending from one side of the housing to an opposite side of the housing across a longitudinal axis of the housing.

18. The filter membrane module according to claim 1, wherein the housing is slipped over the mounting ring and sealingly joined to the mounting ring.

19. The filter membrane module according to claim 1, wherein the housing is unitary with one of the two mounting rings by being manufactured in a single potting operation.

20. The filter membrane module according to claim 7, wherein the housing is slipped over the mounting ring and sealingly joined to the mounting ring.

21. The filter membrane module according to claim 7, wherein the housing is unitary with one of the two mounting rings by being manufactured in a single potting operation.

22. The filter membrane module according to claim 12, wherein the housing is slipped over the mounting ring and sealingly joined to the mounting ring.

23. The filter membrane module according to claim 12, wherein the housing is unitary with one of the two mounting rings by being manufactured in a single potting operation.

24. The filter membrane module according to claim 16, wherein the housing is slipped over the mounting ring and sealingly joined to the mounting ring.

25. The filter membrane module according to claim 16, wherein the housing is unitary with one of the two mounting rings by being manufactured in a single potting operation.

* * * * *

UNITED STATES PATENT AND TRADEMARK OFFICE
CERTIFICATE OF CORRECTION

PATENT NO.        : 10,226,741 B2
APPLICATION NO.   : 15/154793
DATED             : March 12, 2019
INVENTOR(S)       : Christian Goebbert and Manfred Volz It is certified that error appears in the above-identified patent and that said Letters Patent is hereby corrected as shown below:

In the Claims

Column 6, Line 7, Claim 1, after "each" delete "to each".

Signed and Sealed this
Seventh Day of May, 2019

Andrei Iancu
*Director of the United States Patent and Trademark Office*